(12) United States Patent
Gonzui

(10) Patent No.: US 10,239,125 B2
(45) Date of Patent: Mar. 26, 2019

(54) CUTTING INSERT, CUTTING TOOL, AND METHOD FOR MANUFACTURING MACHINED PRODUCT USING SAME

(71) Applicant: KYOCERA Corporation, Kyoto-shi, Kyoto (JP)

(72) Inventor: Hirotoshi Gonzui, Moriyama (JP)

(73) Assignee: KYOCERA Corporation, Kyoto-shi, Kyoto (JP)

(*) Notice: Subject to any disclaimer, the term of this patent is extended or adjusted under 35 U.S.C. 154(b) by 0 days.

(21) Appl. No.: 15/575,209

(22) PCT Filed: May 25, 2016

(86) PCT No.: PCT/JP2016/065447
§ 371 (c)(1),
(2) Date: Nov. 17, 2017

(87) PCT Pub. No.: WO2016/190351
PCT Pub. Date: Jan. 12, 2016

(65) Prior Publication Data
US 2018/0147637 A1 May 31, 2018

(30) Foreign Application Priority Data
May 26, 2015 (JP) .................................. 2015-106434

(51) Int. Cl.
*B23B 27/16* (2006.01)
*B23B 1/00* (2006.01)
*B23B 27/14* (2006.01)

(52) U.S. Cl.
CPC ............ *B23B 27/1611* (2013.01); *B23B 1/00* (2013.01); *B23B 27/141* (2013.01);
(Continued)

(58) Field of Classification Search
CPC .......... B23C 2200/12; B23C 2200/123; B23C 2200/203; B23C 2200/201;
(Continued)

(56) References Cited

U.S. PATENT DOCUMENTS 4,681,488 A * 7/1987 Markusson ............. B23C 5/202
407/113
5,634,745 A * 6/1997 Wiman ................. B23B 27/141
407/113
(Continued)

FOREIGN PATENT DOCUMENTS

JP 2001-157903 A 6/2001
JP 2005-503934 A 2/2005
(Continued)

OTHER PUBLICATIONS

International Search Report (Form PCT/ISA/210) dated Jul. 19, 2016, issued in PCT/JP2016/065447.
(Continued)

*Primary Examiner* — Will Fridie, Jr.
(74) *Attorney, Agent, or Firm* — Viering, Jentschura & Partner MBB

(57) ABSTRACT

In an embodiment, a cutting insert includes an upper surface, a one or more side surfaces, and a cutting edge. The upper surface includes a first corner portion, and a first side that is adjacent to the first corner portion. The side surfaces are adjacent to the upper surface. The cutting edge is disposed on at least a portion of a section where the upper surface and the side surfaces intersect. The cutting edge includes first, second, third and fourth cutting edges. The first cutting edge is disposed at the first corner portion and has a convex curved shape. The second cutting edge is next to the first cutting edge, and has a linear shape. The third cutting edge is next to the second cutting edge, and has a convex curved
(Continued)

shape. The fourth cutting edge is next to the third cutting edge on the first side.

9 Claims, 10 Drawing Sheets

(52) U.S. Cl.
CPC . *B23B 2200/0447* (2013.01); *B23B 2200/201* (2013.01); *B23B 2200/208* (2013.01); *B23B 2200/3618* (2013.01); *B23B 2205/04* (2013.01); *B23B 2222/16* (2013.01); *B23B 2224/04* (2013.01); *B23B 2224/20* (2013.01); *B23B 2224/28* (2013.01); *B23B 2224/32* (2013.01); *B23B 2224/36* (2013.01); *B23B 2228/04* (2013.01); *B23B 2228/08* (2013.01)

(58) Field of Classification Search
CPC ........ B23C 2200/205; B23C 2200/285; B23C 2200/283; B23B 2200/201; B23B 2200/202; B23B 2200/123; B23B 2200/12
See application file for complete search history.

(56) References Cited

U.S. PATENT DOCUMENTS

| | | | | |
|---|---|---|---|---|
| 5,921,721 A * | 7/1999 | Hintze | ................ | B23B 27/1622 407/113 |
| 6,217,263 B1 * | 4/2001 | Wiman | ................ | B23B 27/141 407/114 |
| 6,786,682 B1 * | 9/2004 | Wiman | ................ | B23B 27/143 407/114 |
| 2003/0077131 A1 | 4/2003 | Wiman et al. | | |
| 2006/0013661 A1 * | 1/2006 | Long, II | .............. | B23B 27/1622 407/113 |
| 2007/0297865 A1 * | 12/2007 | Hessman | ................ | B23C 5/207 407/114 |
| 2010/0129167 A1 * | 5/2010 | Morrison | .............. | B23B 27/141 407/114 |
| 2012/0070240 A1 * | 3/2012 | Ishi | ........................... | B23C 5/06 407/42 |
| 2012/0087749 A1 * | 4/2012 | Uno | ........................... | B23C 5/06 407/42 |
| 2013/0094913 A1 * | 4/2013 | Yoshida | .................... | B23C 5/06 407/42 |
| 2014/0010605 A1 * | 1/2014 | Smilovici | ................ | B23C 5/06 407/42 |

FOREIGN PATENT DOCUMENTS

| | | |
|---|---|---|
| JP | 2006-224295 A | 8/2006 |
| WO | 95/32071 A | 11/1995 |
| WO | 2003/026820 A1 | 4/2003 |

OTHER PUBLICATIONS

Written Opinion (Form PCT/ISA/237) dated Jul. 19, 2016, issued in PCT/JP2016/065447.

* cited by examiner

CUTTING INSERT, CUTTING TOOL, AND METHOD FOR MANUFACTURING MACHINED PRODUCT USING SAME

TECHNICAL FIELD

The present invention relates to a cutting insert used for machining, a cutting tool, and a method for manufacturing a machined product using the same.

BACKGROUND

Conventionally, the throw-away cutting tip (cutting insert) described in JP 2005-503934 A (Patent Document 1) has been known as an example of a cutting insert used for machining. The cutting insert described in Patent Document 1 includes a cutting edge, a nose, and a wiper. The wiper includes a curved segment that has a convex curved shape and is adjacent to the nose, and a flat segment that has a linear shape and is adjacent to the nose via the curved segment.

When machining is performed using the cutting insert described in Patent Document 1 and the cutting insert is fed in a direction parallel to the flat segment, unevenness of the machined surface of a work material can be minimized by the flat segment having a linear shape. Nevertheless, under processing conditions in which the cutting insert is fed in a direction inclined with respect to the linear wiper having a linear shape, as in sinking machining, the machined surface is finished using both the cutting edge and an edge of the flat segment having a linear shape. As a result, it can be difficult to adequately minimize the unevenness of the machined surface of the work material by the wiper.

An object of the present invention is to provide a cutting insert not readily affected by processing conditions and capable of increasing the smoothness of a machined surface of a work material.

SUMMARY

In an embodiment, a cutting insert includes an upper surface, one or more side surfaces and a cutting edge. The upper surface includes a first corner portion, and a first side that is adjacent to the first corner portion. The one or more side surfaces are adjacent to the upper surface. The cutting edge is disposed on at least a portion of a section where the upper surface and the side surfaces intersect. When viewed from directly above, the cutting edge includes first, second, third and fourth cutting edges. The first cutting edge is disposed at the first corner portion and has a convex curved shape. The second cutting edge is next to the first cutting edge, and has a linear shape. The third cutting edge is next to the second cutting edge, and has a convex curved shape. The fourth cutting edge is next to the third cutting edge on the first side.

EMBODIMENTS

Figure 1:
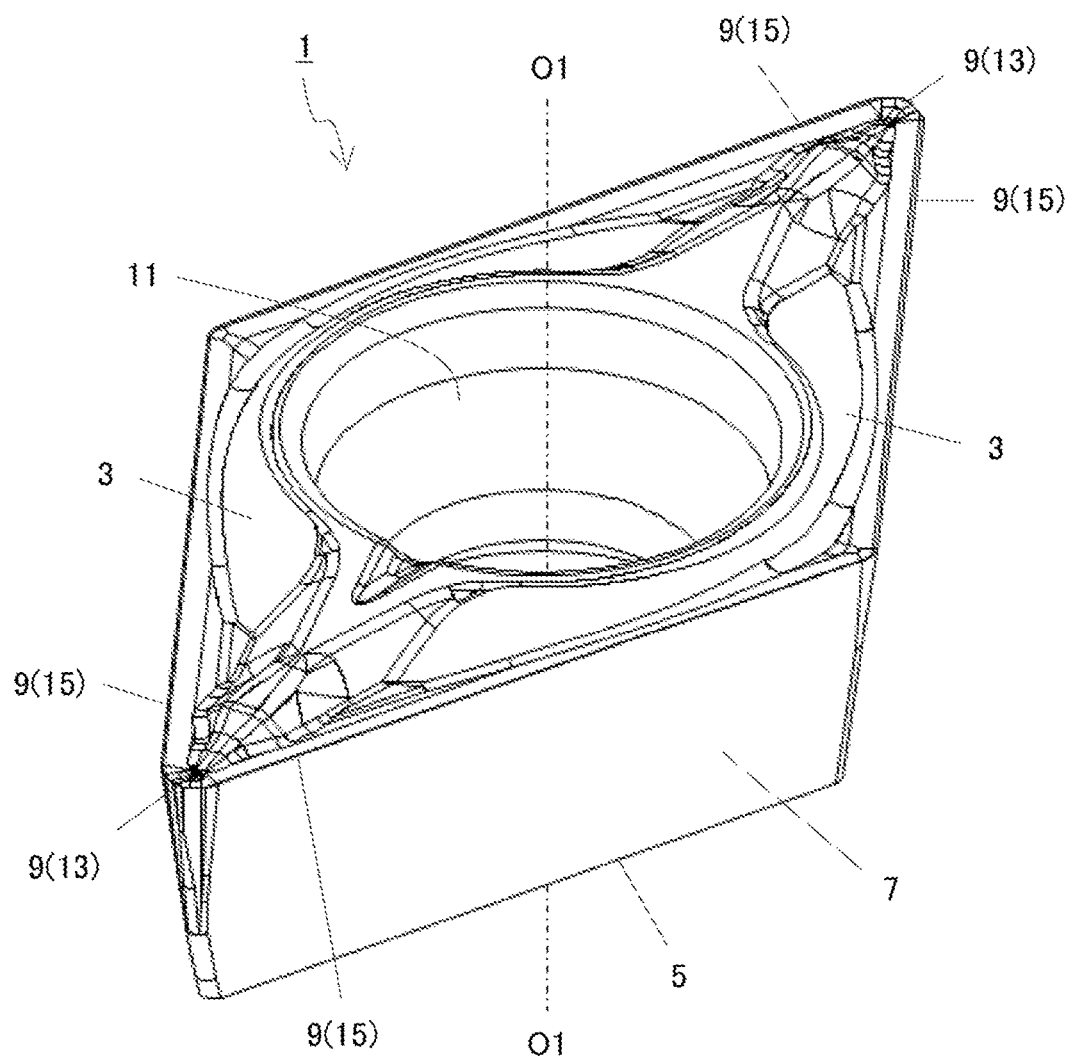
FIG. 1 is a perspective view illustrating a cutting insert in an embodiment.

The following describes in detail a cutting insert 1 of an embodiment with reference to the drawings. However, for ease of explanation, each of the drawings referenced below is simplified and illustrates only the main constituent members needed to describe the present embodiment. Accordingly, the cutting insert of the present invention may be provided with any constituent member which is not illustrated in the referenced drawings. Further, the dimensions of the members in the drawings do not faithfully represent the actual dimensions of the constituent members, the dimension ratios of the members, or the like.

Cutting Insert

Description will be given below of the cutting insert 1 (also referred to below simply as the insert 1) of an embodiment while referencing FIGS. 1 to 5. Note that FIG. 4 is an enlarged view of a region B2 in FIG. 3 and, to clarify the configuration of a cutting edge, schematically illustrates only a section where an upper surface and side surfaces intersect.

The insert 1 of the present embodiment, as illustrated in FIG. 1, includes an upper surface 3, a lower surface 5, side surfaces 7, cutting edges 9, and a through-hole 11. Examples of the material of the insert 1 include cemented carbide alloy, cermet, or the like.

Examples of the composition of the cemented carbide alloy include WC—Co, WC—TiC—Co, and WC—TiC—TaC—Co. Here, tungsten carbide (WC), titanium carbide (TiC) and tantalum carbide (TaC) are hard particles, and cobalt (Co) is a binding phase.

Further, cermet is a sintered composite material obtained by combining a metal with a ceramic component. Specifically, examples of the cermet include titanium compounds in which TiC or titanium nitride (TiN) is the main component.

The surface of the insert 1 may be coated with a coating film using a chemical vapor deposition (CVD) method or a physical vapor deposition (PVD) method. Examples of the composition of the coating film include TiC, TiN, titanium carbonitride (TiCN), alumina ($Al_2O_3$), and the like.

The upper surface 3 has a polygonal shape and includes a plurality of corner portions and a plurality of sides. The upper surface 3 in the present embodiment may have a substantially rhomboid shape. Thus, the upper surface 3 in the present embodiment includes four corner portions and four sides.

Here, the polygonal shape does not strictly refer to a shape of a polygon. For example, each of the corner portions of the upper surface 3 in the present embodiment is not a strict corner but, rather, when viewed from directly above, is a rounded shape. Additionally, the sides connecting adjacent corner portions need not be strictly linear. For example, when viewed from directly above, each side may have an overall shape that slightly protrudes outward.

Figure 2:
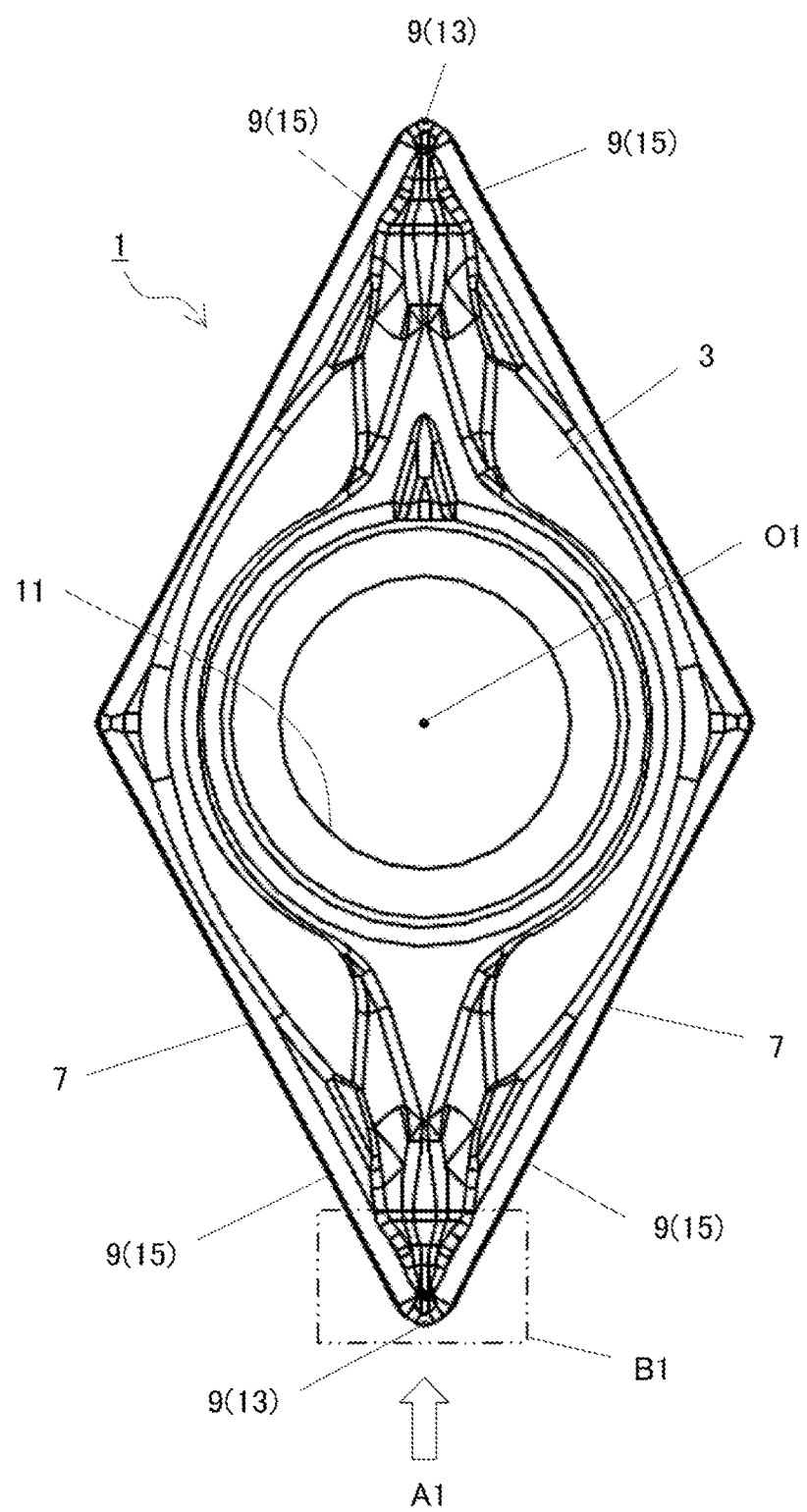
FIG. 2 is a top view of the cutting insert illustrated in FIG. 1.

The upper surface 3 in the present embodiment, as illustrated in FIG. 2, includes two corner portions having acute angles and two corner portions having obtuse angles. A corner portion having an acute angle means that, when viewed from directly above, an angle that is formed by the intersection of two sides and extends from this corner portion is smaller than a right angle. Further, a corner portion having an obtuse angle means that, when viewed from directly above, an angle that is formed by the intersection of two sides and extends from this corner portion is greater than a right angle. While a corner portion having an obtuse angle may be used as part of a machining process for cutting a work material to manufacture a machined product, a corner portion having an acute angle may be used for machining with the insert 1 in the present embodiment. In the following, one corner portion having an acute angle is referred to as a first corner portion, and a side adjacent to this first corner portion is referred to as a first side for convenience.

The lower surface 5 is a surface disposed on a side opposite the upper surface 3, and functions as a seat of an insert pocket when the insert 1 is attached to a holder. While the lower surface 5 in the present embodiment has the same rhomboid shape as the upper surface 3, the lower surface 5 is slightly smaller than the upper surface 3.

Here, the shapes of the upper surface 3 and the lower surface 5 are not limited to those in the embodiment described above. While the shape of the upper surface 3 of the insert 1 in the present embodiment is substantially quadrilateral, the shape of the upper surface 3 may be a polygonal shape such as a triangle or a pentagon. Furthermore, while the upper surface 3 and the lower surface 5 in the present embodiment each have a rhombic shape, the quadrilateral shape is not limited to such a shape, and the shape may be a parallelogram, for example.

The insert 1 of the present embodiment includes the through-hole 11 disposed from a center of the upper surface 3 towards a center of the lower surface 5. The through-hole 11 is provided for screw insertion when the insert 1 is screw-fastened to a holder of a cutting tool. A central axis O1 of the through-hole 11 matches an imaginary line passing through the center of the upper surface 3 and the center of the lower surface 5.

The side surfaces 7 are disposed between the upper surface 3 and the lower surface 5, and are each connected to the upper surface 3 and the lower surface 5. Thus, the side surfaces 7 are adjacent to the upper surface 3. Further, the side surfaces 7 are each linear in a cross section along the central axis O1 of the through-hole 11. At this time, the bottom surface 5 may have a shape that is slightly smaller than the upper surface 3, and thus the side surfaces 7 are inclined so as to come closer to the central axis O1 from an upper end connected to the upper surface 3 toward a lower end connected to the lower surface 5.

A width when the insert 1 in the present embodiment is viewed directly from above is from 6 to 25 mm. Further, a height from the lower surface 5 to the upper surface 3 is from 1 to 10 mm. Here, the width when viewed directly from above means a maximum width of the upper surface 3, and in the present embodiment means a width from an upper end portion to a lower end portion in FIG. 2. Further, the height from the lower surface 5 to the upper surface 3 means a width between an upper end of the upper surface 3 and a lower end of the lower surface 5 in a direction parallel to the central axis O1.

The cutting edge 9 is disposed in a section where the upper surface 3 and the side surfaces 7 intersect, that is, in at least a part of the ridge portions of the upper surface 3 and the side surfaces 7. The cutting edge 9 is used to cut the work material during machining. The regions where the upper surface 3 and the side surfaces 7 intersect and where the cutting edges 9 are formed may be subjected to what is referred to as a "honing process." That is, each of the ridge portions at the intersections between the upper surface 3 and the side surfaces 7 need not have a strict linear shape formed by the intersection of the two surfaces. When the ridge portion described above has a linear shape, the strength of the cutting edge 9 decreases. Thus, in regions where the upper surface 3 and the side surfaces 7 intersect, an R honing process that causes these regions to become curved is carried out.

Figure 3:
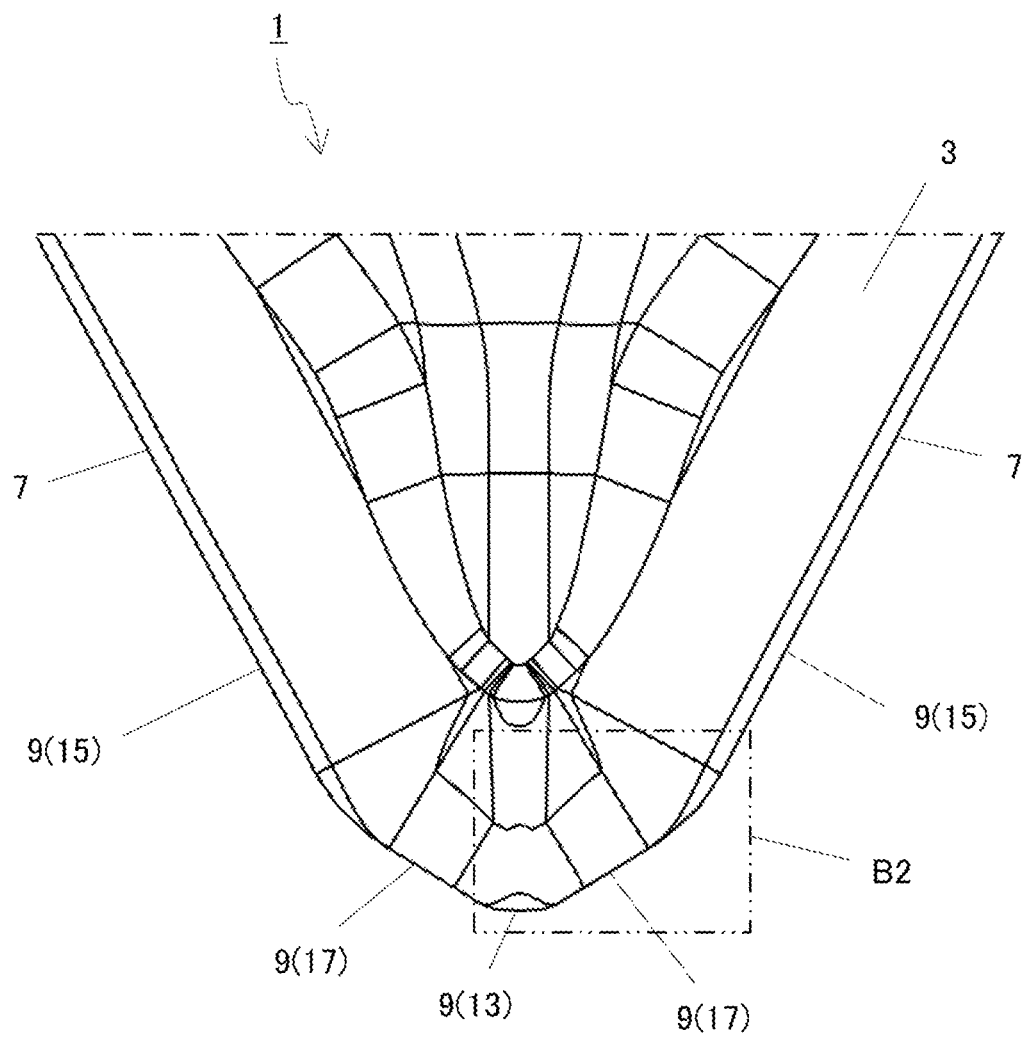
FIG. 3 is an enlarged view of a region B1 illustrated in FIG. 2.
Figure 4:
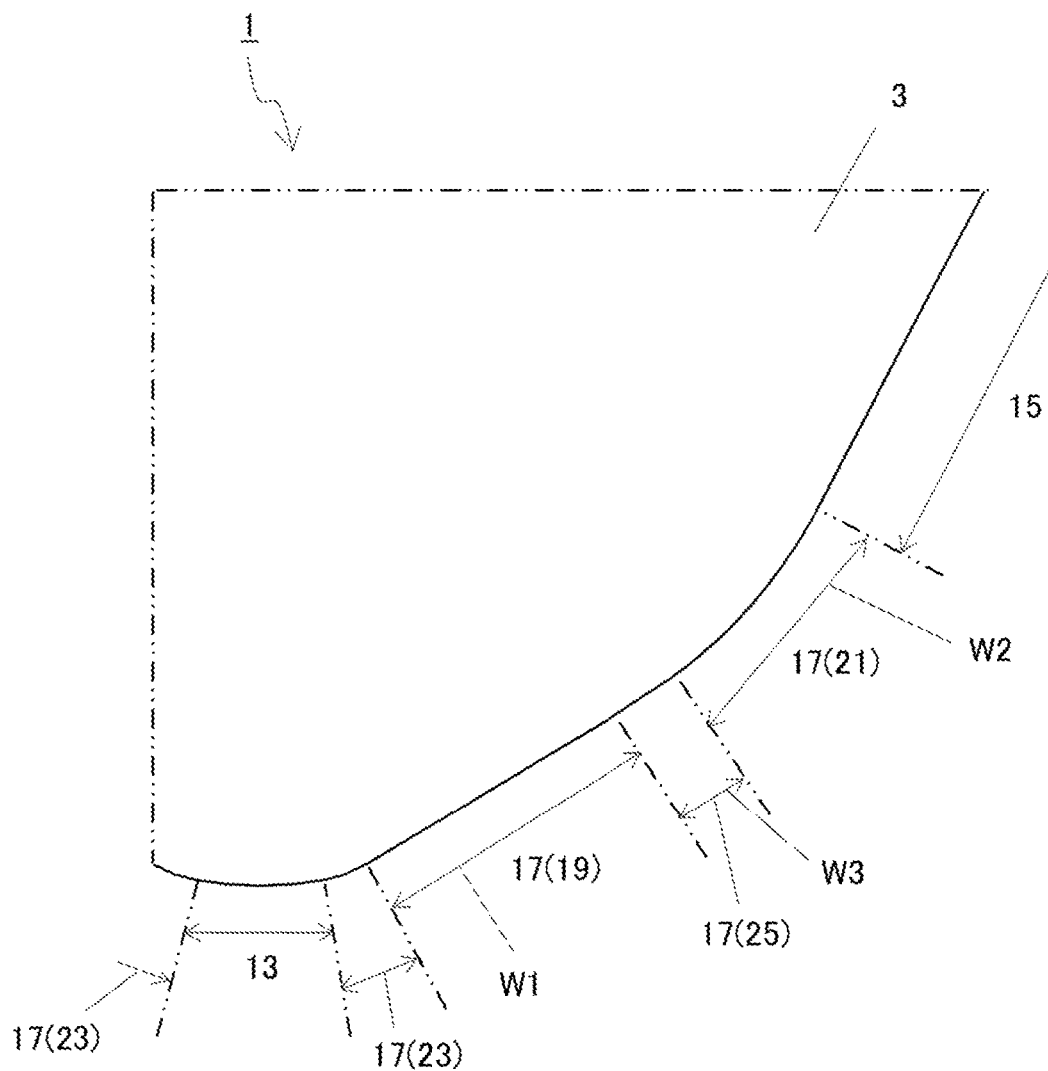
FIG. 4 is a schematic view of a section where an upper surface and side surfaces intersect in the region B2 illustrated in FIG. 3.
Figure 5:
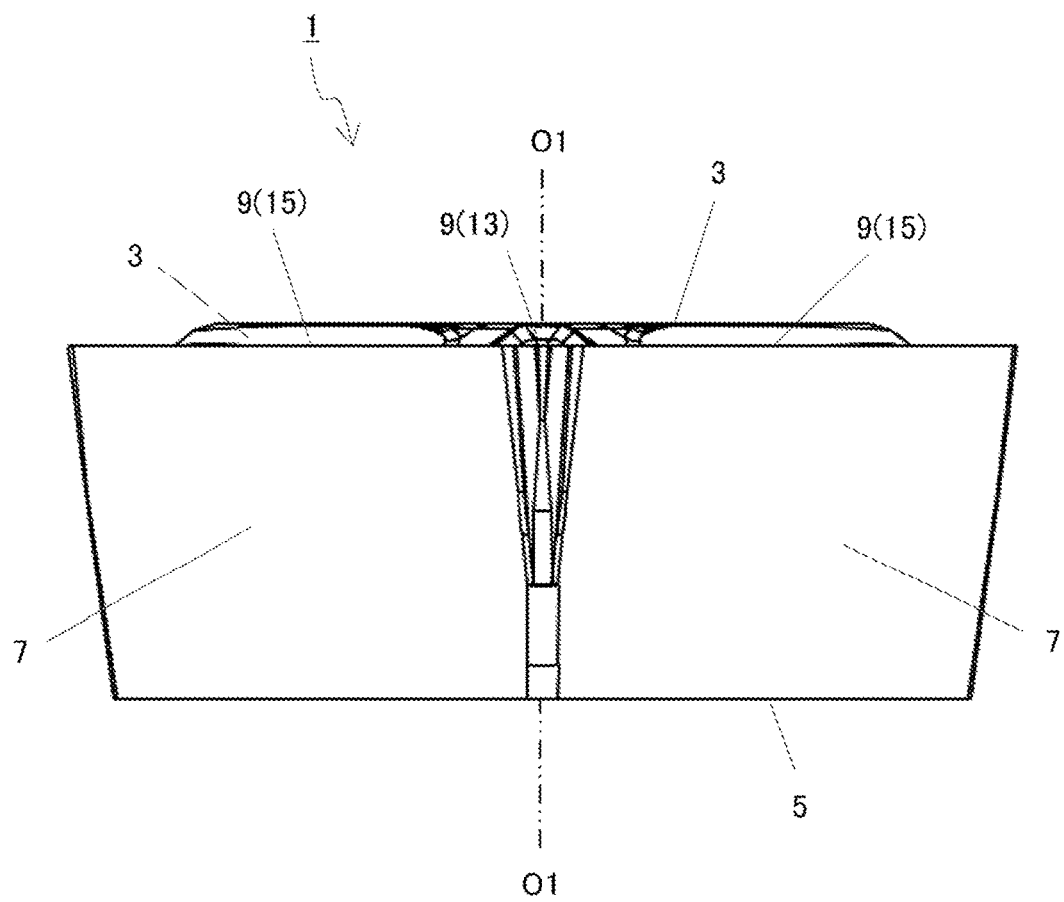
FIG. 5 is a side view of the cutting insert illustrated in FIG. 2 as viewed from an A1 direction.

The cutting edge 9 in the present embodiment, as illustrated in FIG. 3, includes a first cutting edge 13 and a fourth cutting edge 15. The first cutting edge 13 is disposed at the first corner portion of the upper surface 3. The corner portions in the present embodiment each have the rounded shape when viewed from directly above, and thus the first cutting edge 13 has a convex curved shape. The first cutting edge 13 is a section that is generally called a corner cutting edge.

The fourth cutting edge 15 is disposed on the first side of the upper surface 3. The sides of the upper surface 3 in the present embodiment are each generally linear in shape, and thus the fourth cutting edge 15 has a linear shape. Note that the fourth cutting edge 15 is the main cutting edge 9 when the work material is cut, and is therefore generally called the main cutting edge.

Further, the cutting edge 9 in the present embodiment, as illustrated in FIG. 3, includes a wiper cutting edge 17 disposed between the first cutting edge 13 and the fourth cutting edge 15. The first cutting edge 13 having the convex curved shape is disposed on a corner portion of the upper surface 3, and thus the wiper cutting edge 17 is disposed near an end portion connected to the first corner portion of the first side. The wiper cutting edge 17 is an area of the cutting edge 9 that functions to increase the smoothness of a machined surface of the work material, and is also referred to as the flat cutting edge.

The wiper cutting edge 17 includes a second cutting edge 19 and a third cutting edge 21. The second cutting edge 19 is disposed closer to the first cutting edge 13 than to the third cutting edge 21, and next to the first cutting edge 13. Further, the third cutting edge 21 is disposed closer to the fourth cutting edge 15 than to the second cutting edge 19, and next to the fourth cutting edge 15.

The second cutting edge 19 in the present embodiment has a linear shape when viewed from directly above. Further, the third cutting edge 21 has a convex curved shape when viewed from directly above. Specifically, the third cutting edge 21 has an arc shape that protrudes outward when viewed from directly above.

The second cutting edge 19 in the present embodiment is an area of the cutting edge 9 used as the main wiper cutting edge in main machining, and specifically machining in which the insert 1 is fed in a direction along a rotational axis of the work material. Put differently, the insert 1 is fed in a direction parallel to the machined surface of the work material. Thus, machining of the work material is preferably performed with the second cutting edge 19 parallel to the rotational axis of the work material.

Note that, in the present embodiment, the second cutting edge 19 having a linear shape does not mean a strictly linear shape. Similar to the side of the upper surface 3 where the fourth cutting edge 15 is formed, the second cutting edge 19 may have a shape that slightly protrudes outward when viewed from directly above. Note that, even when there is a slight protrusion, the protrusion is a gentle curve having a radius of curvature greater than the radii of curvature of the first cutting edge 13, the third cutting edge 21, a first connecting edge 23 (described later), and a second connecting edge 25 (described later).

Further, the third cutting edge 21 is an area of the cutting edge 9 used as the wiper cutting edge in machining in which the insert 1 is fed in a direction inclined with respect to the rotational axis of the work material, as in sinking machining. In sinking machining, the angle of inclination with respect to the rotational axis in the direction in which the insert 1 is fed differs according to processing conditions. Thus, to support the variation in the angle of inclination described above, the third cutting edge 21 in the present embodiment does not have a linear shape but rather a convex curved shape. In particular, the third cutting edge 21 in the present embodiment has an arc shape, thereby decreasing the impact on the third cutting edge 21 caused by the variation of the angle of inclination described above.

As described above, according to the insert 1 in the present embodiment, the cutting edge 9 may include the first cutting edge 13, the second cutting edge 19, the third cutting edge 21, and the fourth cutting edge 15; therefore, in basic machining in which the cutting insert 1 is fed in a direction parallel to the machined surface of the work material, it is possible to increase the smoothness of the machined surface of the work material by means of the second cutting edge 19 having a linear shape. Furthermore, in machining such as sinking machining, it is possible to increase the smoothness of the machined surface of the work material by using the third cutting edge 21 having a convex curved shape. As a result, the insert 1 is not readily impacted by processing conditions, and is capable of increasing the smoothness of the machined surface of the work material.

In the main machining in which the insert 1 is fed in a direction parallel to the machined surface of the work material, the second cutting edge 19 is used as a flat cutting edge. When the insert 1 in the present embodiment is viewed directly from above and a width W1 of the second cutting edge 19 is greater than a width W2 of the third cutting edge 21, the width of the second cutting edge 19 may be relatively large, making it possible to finish the machined surface into a favorable surface with minimal unevenness during main machining.

Here, the widths of the second cutting edge 19 and the third cutting edge 21 each refer to a length of an imaginary line segment that connects the respective end portions, as illustrated in FIG. 4.

In the present embodiment, as illustrated in FIG. 4, the first cutting edge 13 and the second cutting edge 19 are connected by the first connecting edge 23 having a convex curved shape. When such a configuration is satisfied, the first cutting edge 13 and the second cutting edge 19 may be smoothly connected, making it possible to achieve desirable performance of both the first cutting edge 13 and the second cutting edge 19. Furthermore, the degree of freedom in the design of the first cutting edge 13 and the second cutting edge 19 is increased.

In the present embodiment, as illustrated in FIG. 4, the second cutting edge 19 and the third cutting edge 21 are connected by the second connecting edge 25 having a convex curved shape. When such a configuration is satisfied, the second cutting edge 19 and the third cutting edge 21 may be smoothly connected, making it possible to achieve desirable performance of both the second cutting edge 19 and the third cutting edge 21. Furthermore, the degree of freedom in the design of the second cutting edge 19 and the third cutting edge 21 is increased.

As described above, the first cutting edge 13 in the present embodiment refers to a region that is disposed at a corner portion having an acute angle on the upper surface 3 and has a uniform radius of curvature. The first connecting edge 23 refers to a region that is connected to the first cutting edge 13 and has a radius of curvature different from that of the first cutting edge 13. The second cutting edge 19 refers to a region that is connected to the first connecting edge 23 and has a linear shape. The second connecting edge 25 refers to a region that is connected to the second cutting edge 19 and has a uniform radius of curvature. The third cutting edge 21 refers to a region that is connected to the second connecting edge 25 and has a radius of curvature different from that of the second connecting edge 25. Further, the third cutting edge 21 is connected to the fourth cutting edge 15 as well.

The first cutting edge 13 and the first connecting edge 23 in the present embodiment both have an arc shape. At this time, a radius of curvature Ra of the first connecting edge 23 is less than the radius of curvature Ra of the first cutting edge 13. Specifically, the radius of curvature Ra of the first cutting edge 13 is from 0.1 to 0.8 mm, and the radius of curvature Ra of the first connecting edge 23 is from 0.01 to 0.3 mm. Furthermore, when the radius of curvature Ra of the first connecting edge 23 is less than the radius of curvature Ra of the first cutting edge 13, a thickness of chips can be ensured. As a result, the smoothness of the machined surface can be increased.

Further, the third cutting edge 21 and the second connecting edge 25 in the present embodiment both have an arc shape. At this time, the radius of curvature Ra of the second connecting edge 25 is greater than the radius of curvature Ra of the third cutting edge 21. Specifically, in the insert 1 illustrated in FIG. 4, the radius of curvature Ra of the second connecting edge 25 is from 0.5 to 1 mm, and the radius of curvature Ra of the third cutting edge 21 is from 0.01 to 0.8 mm.

During machining such as sinking machining in which the angle of inclination in the feeding direction of the insert 1 with respect to the rotational axis of the work material is small, the second connecting edge 25 may function as a flat cutting edge without the third cutting edge 21 coming into contact with the work material. Even in such a case, the radius of curvature Ra of the second connecting edge 25 is greater than the radius of curvature Ra of the third cutting edge 21, making it possible to achieve favorable smoothness of the machined surface.

For the reasons described above, preferably the radius of curvature Ra of the first connecting edge 23 is a relatively small value, and the radius of curvature Ra of the second connecting edge 25 is relatively a large value. Thus, in the present embodiment, the radius of curvature Ra of the second connecting edge 25 is greater than the radius of curvature Ra of the first connecting edge 23.

However, when the width of the second connecting edge 25 is excessively large, the insert 1 may become excessively large overall. Thus, preferably a width W3 of the second connecting edge 25 is less than the width W2 of the third cutting edge 21; put differently, the width W2 of the third cutting edge 21 is greater than the width of the second connecting edge 25. Here, the width W3 of the second connecting edge 25 refers to a length of an imaginary line segment that connects the end portions of the second connecting edge 25.

Cutting Tool

Next, description will be given of a cutting tool 101 of an embodiment with reference to the drawings.

Figure 6:
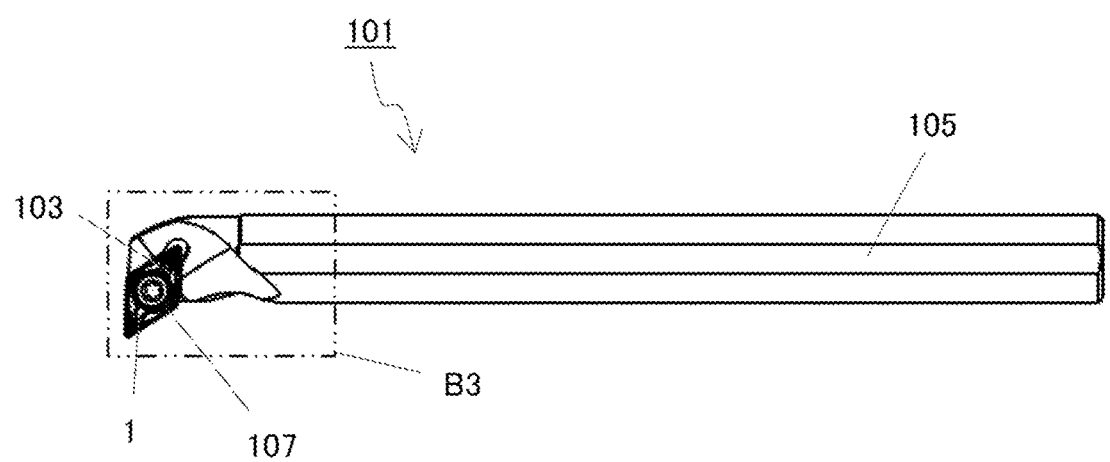
FIG. 6 is a top view illustrating a cutting tool of an embodiment.
Figure 7:
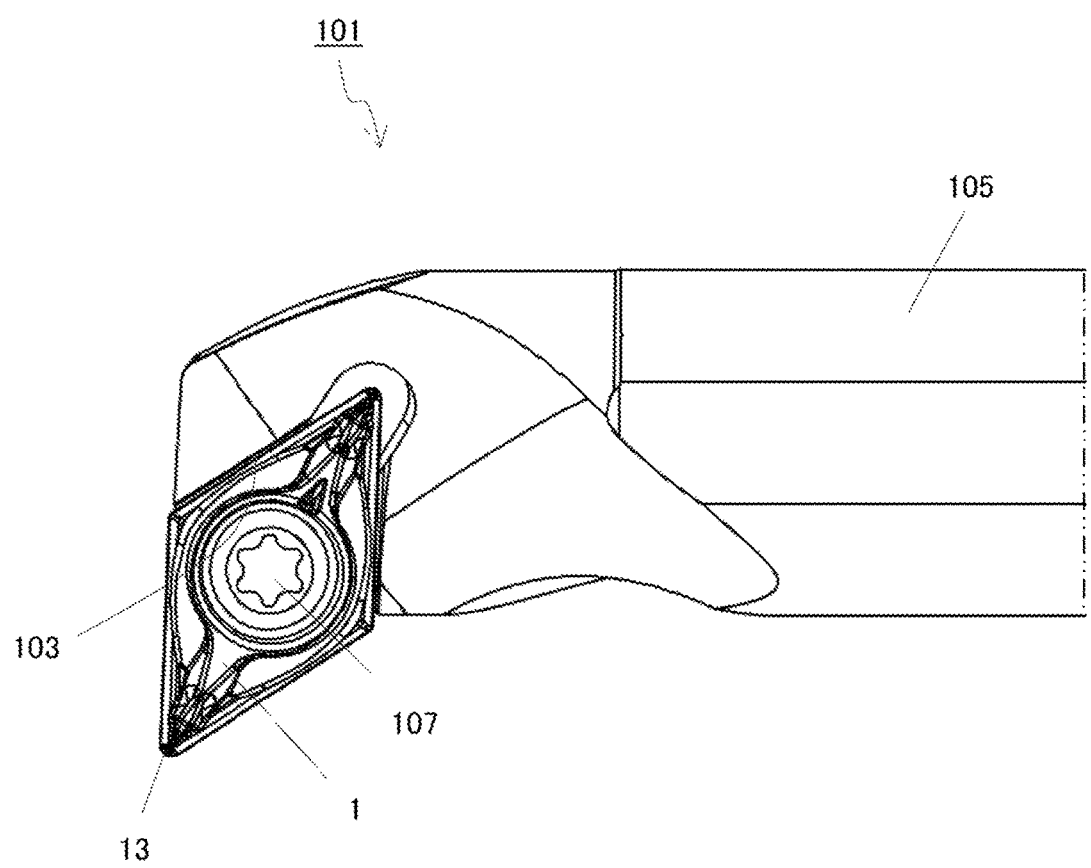
FIG. 7 is an enlarged view of a region B3 illustrated in FIG. 6.

The cutting tool 101 of the present embodiment, as illustrated in FIGS. 6 and 7, includes a holder 105 provided with a pocket 103 disposed on a tip side, and the insert 1 described above disposed inside the pocket 103. The insert 1 is mounted in the holder 105 of the cutting tool 101 of the present embodiment, with the first cutting edge 13 protruding from the tip of the holder 105.

The holder 105 forms a long and slender rod shape. Moreover, one pocket 103 is disposed on the tip side of the holder 105. The pocket 103 is a section in which the insert 1 is mounted, and is opened to a tip surface and an outer peripheral surface of the holder 105. At this time, the pocket 103 is opened to the outer peripheral surface of the holder 105, making it possible to easily mount the insert 1. Specifically, the pocket 103 includes a seating face and a binding side face. The seating face is parallel to a lower surface of the holder 105. The binding side face inclines with respect to the seating face.

The insert 1 is configured to be mounted in the pocket 103. The insert 1 is configured to be mounted with the cutting edge protruding outward from the holder 105. In the present embodiment, the insert 1 is mounted on the holder 105 using a fixing screw 107. Specifically, the insert 1 is mounted on the holder 105 by inserting the fixing screw 107 into a through-hole in the insert 1, inserting a tip of this fixing screw 107 into a screw hole formed in the insert pocket 103, and screwing thread portions thereof.

For the holder 105, it is possible to use steel, cast iron, or the like. In particular, it is preferable to use steel with a high toughness in these members.

Method for Manufacturing Machined Product

Next, a description will be given of a method for manufacturing a machined product of an embodiment of the present invention with reference to the drawings.

The machined product is manufactured by carrying out machining on a work material 201. The method for manufacturing a machined product in the present embodiment includes the following steps. That is, method for manufacturing includes:

(1) rotating the work material 201,
(2) bringing the cutting tool 101 represented in the embodiment described above into contact with the work material 201 that is rotating, and
(3) separating the cutting tool 101 from the work material 201.

Figure 8:
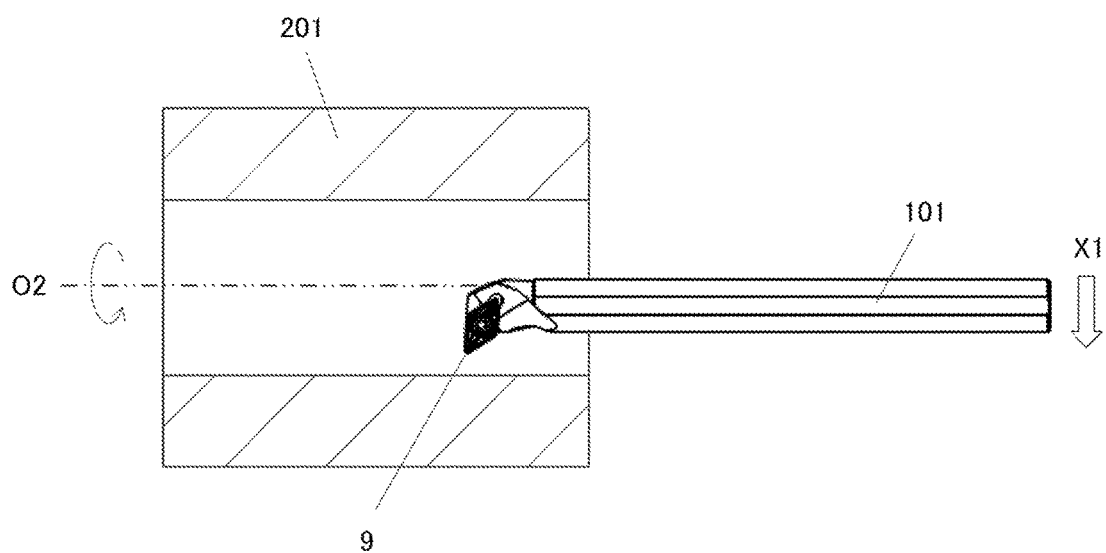
FIG. 8 is a schematic view illustrating one step of a method for manufacturing a machined product in an embodiment.
Figure 9:
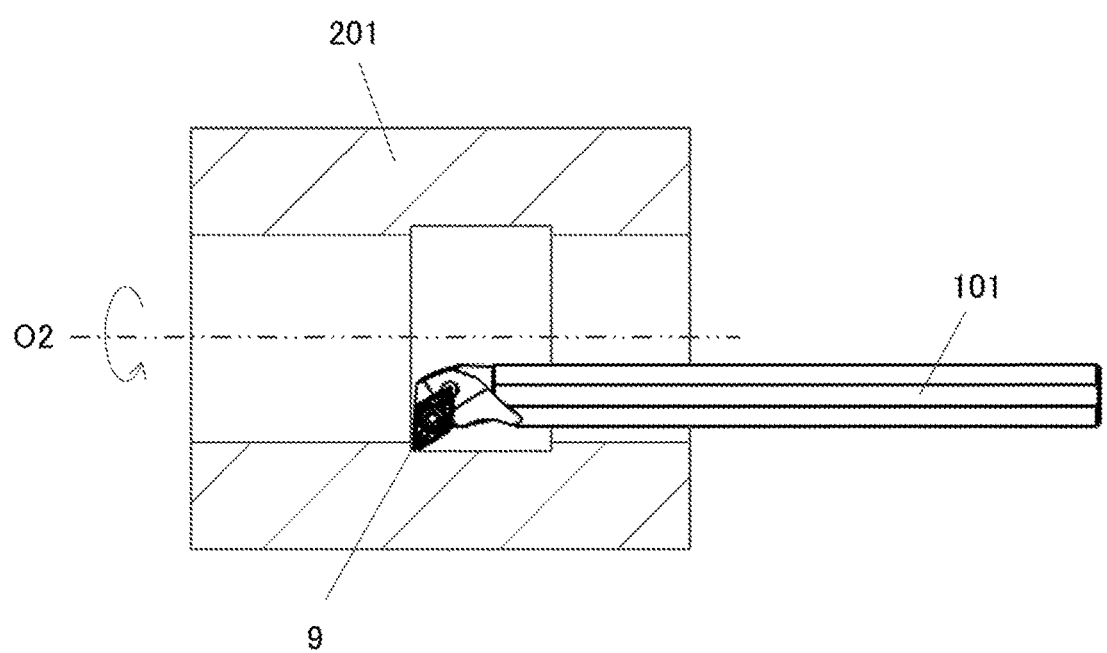
FIG. 9 is a schematic view illustrating one step of the method for manufacturing a machined product in an embodiment.
Figure 10:
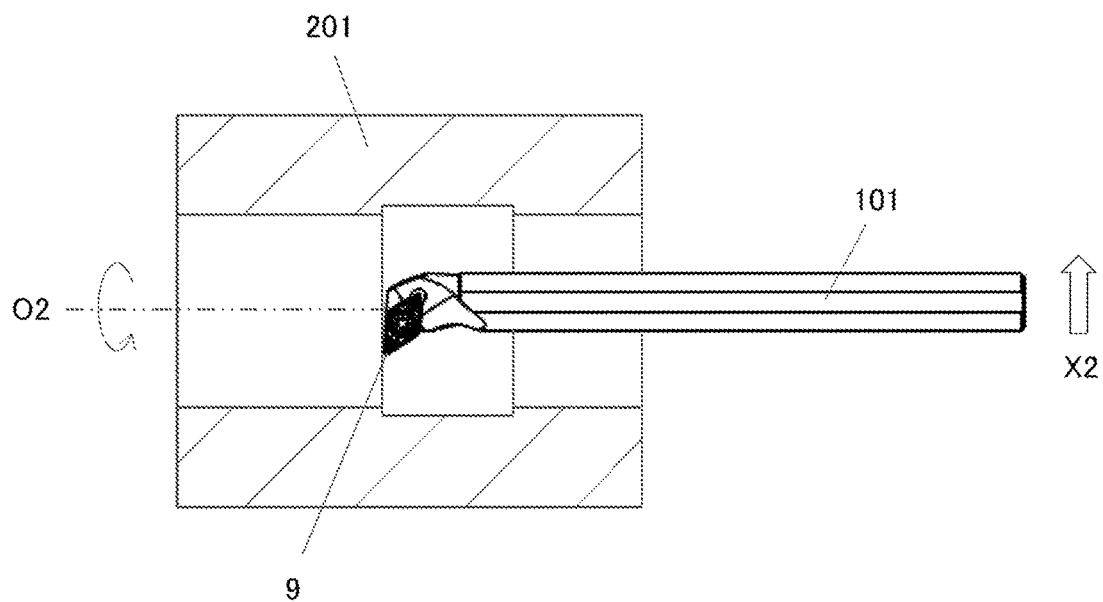
FIG. 10 is a schematic view illustrating one step of the method for manufacturing a machined product in an embodiment.

More specifically, first, as illustrated in FIG. 8, the work material 201 is made to rotate about an axis O2, and the cutting tool 101 is brought relatively near the work material 201. Next, as illustrated in FIG. 9, the cutting edge 9 of the cutting tool 101 is brought into contact with the work material 201 to cut the work material 201. Then, as illustrated in FIG. 10, the cutting tool 101 is moved away relative to the work material 201.

In the present embodiment, the cutting tool 101 is brought close to the work material 201 by moving the cutting tool 101 in an X1 direction in a state where the axis O2 is fixed and the work material 201 is rotating. Furthermore, in FIG. 9, the work material 201 is cut by bringing the cutting edge 9 of the cutting insert into contact with the work material 201 that is rotating. Furthermore, in FIG. 10, the cutting tool 101 is moved away from the work material 201 by being moved in an X2 direction, while the work material 201 is rotating.

Furthermore, in the machining of the manufacturing method of the present embodiment, in each of the respective steps, although the cutting tool 101 is brought into contact with or separated from the work material 201 by moving the cutting tool 101, the present embodiment is of course not limited to such a mode.

For example, in step (1), the work material 201 may be brought close to the cutting tool 101. In the same manner, in step (3), the work material 201 may be moved away from the cutting tool 101. In a case where the machining is to be continued, steps of bringing the cutting edge 9 of the cutting insert 1 into contact with different positions of the work material 201 may be repeated by maintaining the rotating state of the cutting tool 201.

Here, representative examples of the material of the work material 201 include carbon steel, alloy steel, stainless steel, cast iron, non-ferrous metals, or the like.

REFERENCE SIGNS LIST

1 Cutting insert (insert)
3 Upper surface
5 Lower surface
7 Side surface
9 Cutting edge
11 Through-hole
13 First cutting edge
15 Fourth cutting edge
17 Wiper cutting edge
19 Second cutting edge
21 Third cutting edge
23 First connecting edge
25 Second connecting edge
101 Cutting Tool
103 Insert pocket (pocket)
105 Holder
107 Fixing screw
201 Work material

What is claimed is:

1. A cutting insert, comprising:
an upper surface comprising:
a first corner portion; and
a first side adjacent to the first corner portion;
one or more side surfaces adjacent to the upper surface; and
a cutting edge:
disposed on at least a portion of a section where the upper surface and the one or more side surfaces intersect; and
when viewed from directly above, comprising:
a first cutting edge at the first corner portion, having a convex curved shape;
a second cutting edge next to the first cutting edge, having a linear shape and;
a third cutting edge next to the second cutting edge, having a convex curved shape;
a fourth cutting edge next to the third cutting edge on the first side;
a first connecting edge having a convex curved shape, and connecting the first cutting edge and the second cutting edge; and
a second connecting edge having a convex curved shape, and connecting the second cutting edge and the third cutting edge.

2. The cutting insert according to claim 1, wherein a width of the second cutting edge is greater than a width of the third cutting edge, when viewed from directly above.

3. The cutting insert according to claim 1, wherein:
the first connecting edge and the second connecting edge each have an arc shape; and
a radius of curvature of the second connecting edge is greater than a radius of curvature of the first connecting edge.

4. The cutting insert according to claim 1, wherein a radius of curvature of the first cutting edge is greater than the radius of curvature of the first connecting edge.

5. The cutting insert according to claim 1, wherein a width of the third cutting edge is greater than a width of the second connecting edge when viewed from directly above.

6. The cutting insert according to claim 1, wherein the fourth cutting edge has a linear shape when viewed from directly above.

7. The cutting insert according to claim 1, wherein the third cutting edge has an arc shape when viewed from directly above.

8. A cutting tool comprising:
a holder comprising a pocket disposed on a tip side; and
the cutting insert according to claim 1, disposed in the pocket.

9. A method for manufacturing a machined product, the method comprising:
rotating a work material;
bringing the cutting tool according to claim 8 into contact with the work material that is rotating; and
separating the cutting tool from the work material.

* * * * *